United States Patent
Sung (10) Patent No.: US 11,463,653 B2
(45) Date of Patent: Oct. 4, 2022

(54) VIDEO TRANSMISSION SYSTEM

(71) Applicant: REALTEK SEMICONDUCTOR CORP., Hsinchu (TW)

(72) Inventor: Lien-Hsiang Sung, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/319,248

(22) Filed: May 13, 2021

(65) Prior Publication Data
US 2022/0086388 A1 Mar. 17, 2022

Related U.S. Application Data

(60) Provisional application No. 63/079,057, filed on Sep. 16, 2020.

(30) Foreign Application Priority Data
Feb. 23, 2021 (TW) ................. 110106379

(51) Int. Cl.
*H04N 7/035* (2006.01)
*H04N 19/40* (2014.01)
*H04N 7/01* (2006.01)

(52) U.S. Cl.
CPC ........... *H04N 7/035* (2013.01); *H04N 7/01* (2013.01); *H04N 19/40* (2014.11)

(58) Field of Classification Search
CPC ......... H04N 7/035; H04N 7/01; H04N 19/40; H04N 7/08; G09G 5/18; G09G 2310/08; G09G 2340/12; G09G 2360/06; G09G 2370/04; G09G 5/006
See application file for complete search history.

(56) References Cited

U.S. PATENT DOCUMENTS

| | | | | |
|---|---|---|---|---|
| 3,335,218 A * | 8/1967 | Johnson | ........... | H04N 5/91 386/338 |
| 4,605,961 A * | 8/1986 | Frederiksen | ........ | H04N 7/1675 725/31 |
| 4,698,679 A * | 10/1987 | Balaban | ........... | H04N 5/08 327/98 |
| 5,122,885 A * | 6/1992 | Yoshioka | ........... | H04N 9/832 386/269 |
| 5,550,566 A * | 8/1996 | Hodgson | ........... | G06T 1/0007 345/555 |
| 5,907,656 A * | 5/1999 | Oguro | ........... | G11B 27/3063 |
| 6,546,188 B1 * | 4/2003 | Ishii | ........... | G11B 27/34 386/280 |
| 2009/0010623 A1 * | 1/2009 | Date | ........... | H04N 19/85 375/E7.199 |

FOREIGN PATENT DOCUMENTS

| TW | 200714061 A | 4/2007 |
|---|---|---|
| TW | 200847143 A | 12/2008 |
| TW | M535915 U | 1/2017 |

* cited by examiner

*Primary Examiner* — Paulos M Natnael
(74) *Attorney, Agent, or Firm* — Birch, Stewart, Kolasch & Birch, LLP (57) ABSTRACT

A video transmission system includes a first processing circuit and a second processing circuit. The first processing circuit is configured to output a composite video signal. The composite video signal includes a video area, an extension area, and an edge area. The extension area stores a non-video signal. The second processing circuit is configured to receive the composite video signal and extract the non-video signal from the composite video signal.

8 Claims, 6 Drawing Sheets

VIDEO TRANSMISSION SYSTEM

CROSS-REFERENCES TO RELATED APPLICATIONS

This application claims the benefit of U.S. provisional application Ser. No. 63/079,057, filed on Sep. 16, 2020 and claims the priority of Patent Application No. 110106379 filed in Taiwan, R.O.C. on Feb. 23, 2021. The entirety of the above-mentioned patent applications are hereby incorporated by references herein and made a part of the specification.

BACKGROUND

Technical Field

The present disclosure relates to the field of video transmission, and in particular, to a video transmission system.

Related Art

With the rapid development of current technologies, the demand for video transmission is also increasing. At present, video transmission needs to rely on a plurality of transmission channels to transmit video signals and numerous signals that match the video signal. For example, when a TV SoC transmits a signal to a panel, the video transmission also needs other transmission channels to transmit non-video signals in addition to the transmission channel for transmitting the video signal, so that information to be outputted by the TV SoC can be completely transmitted to the panel, and the panel can operate normally.

However, the video transmission method in which the signals are transmitted through respective transmission channels causes some problems, for example, a distance for video transmission cannot be too large, and a diameter of a transmission line cannot be reduced, which causes a large number of restrictions on the use of video transmission.

SUMMARY

In view of the above, the present disclosure provides a video transmission system.

According to some embodiments, the video transmission system includes a first processing circuit and a second processing circuit. The first processing circuit is configured to output a composite video signal. The composite video signal includes a video area, an extension area, and an edge area. The extension area stores a non-video signal. The second processing circuit is configured to receive the composite video signal and extract the non-video signal from the composite video signal.

According to some embodiments, the first processing circuit is configured to receive the non-video signal and a basic video signal, and incorporate the non-video signal into the basic video signal, so that the basic video signal in a first video format is converted to the composite video signal in a second video format.

According to some embodiments, the first video format and the second video format have a horizontal video difference and a vertical video difference. The basic video signal includes a basic video area and a basic edge area. The first processing circuit divides the basic edge area into the extension area and the edge area according to the horizontal video difference and the vertical video difference, stores the non-video signal in the extension area, uses the basic video area as the video area, and obtains the composite video signal according to the video area, the extension area, and the edge area.

According to some embodiments, a part of the extension area that does not store the non-video signal is used as a redundant area. The first processing circuit stores the redundant signal in the redundant area.

According to some embodiments, the first processing circuit stores video format information, and the video format information includes a first video format and a second video format. When the first processing circuit incorporates the non-video signal into the basic video signal, the first processing circuit converts the basic video signal in the first video format to the composite video signal in the second video format according to the video format information.

According to some embodiments, the second processing circuit stores video format information, and the video format information includes a first video format and a second video format. The second processing circuit extracts the extension area from the composite video signal according to the first video format and the second video format and extracts the non-video signal from the extension area. The second processing circuit extracts the video area from the composite video signal according to the first video format, uses the video area as a basic video area, and obtains a basic video signal in the first video format according to the basic video area.

According to some embodiments, the video transmission system further includes an encoding circuit and a decoding circuit. The encoding circuit is configured to receive the composite video signal from the first processing circuit and encode the composite video signal into an encoded composite video signal. The decoding circuit is configured to receive the encoded composite video signal outputted by the encoding circuit, decode the encoded composite video signal into a composite video signal, and output the composite video signal to the second processing circuit.

According to some embodiments, the video transmission system further includes a first chip and a second chip. The first chip is configured to output a basic video signal and a non-video signal to the first processing circuit. The second chip is configured to receive the basic video signal and the non-video signal outputted by the second processing circuit.

Based on the above, according to the video transmission system in some embodiments of the present disclosure, signal transmission can be performed between the first processing circuit and the second processing circuit by using the composite video signal. Since the composite video signal is a video signal, the composite video signal includes a video signal and a non-video signal, and the second processing circuit can extract the non-video signal from the composite video signal, after the second processing circuit receives the composite video signal, the second processing circuit can obtain the video signal and the non-video signal. Therefore, the function of simultaneously transmitting the video signal and the non-video signal between the first processing circuit and the second processing circuit can be achieved by using the composite video signal, that is, only the transmission channel for transmitting the composite video signal is needed between the first processing circuit and the second processing circuit to achieve the function of simultaneously transmitting the video signal and the non-video signal.

DETAILED DESCRIPTION

The present disclosure relates to a video transmission system. Although there are several preferred modes for implementing the present disclosure described in the specification, it should be understood that the present disclosure can still be implemented in many ways, and should not be limited to the following specific embodiments or specific ways of implementing the following features. In other cases, the known details are not described again or discussed to avoid obscuring the focus of the present disclosure.

Figure 1:
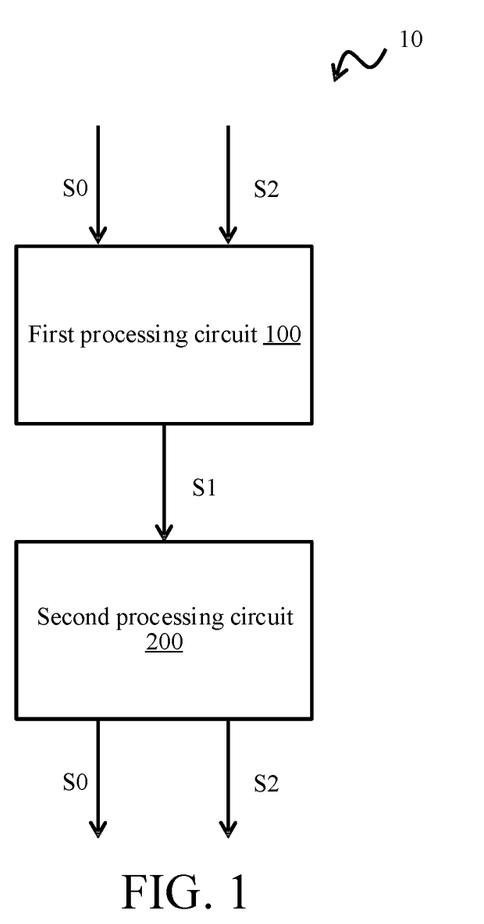
FIG. 1 is a schematic diagram of a video transmission system according to some embodiments of the present disclosure.
Figure 2:
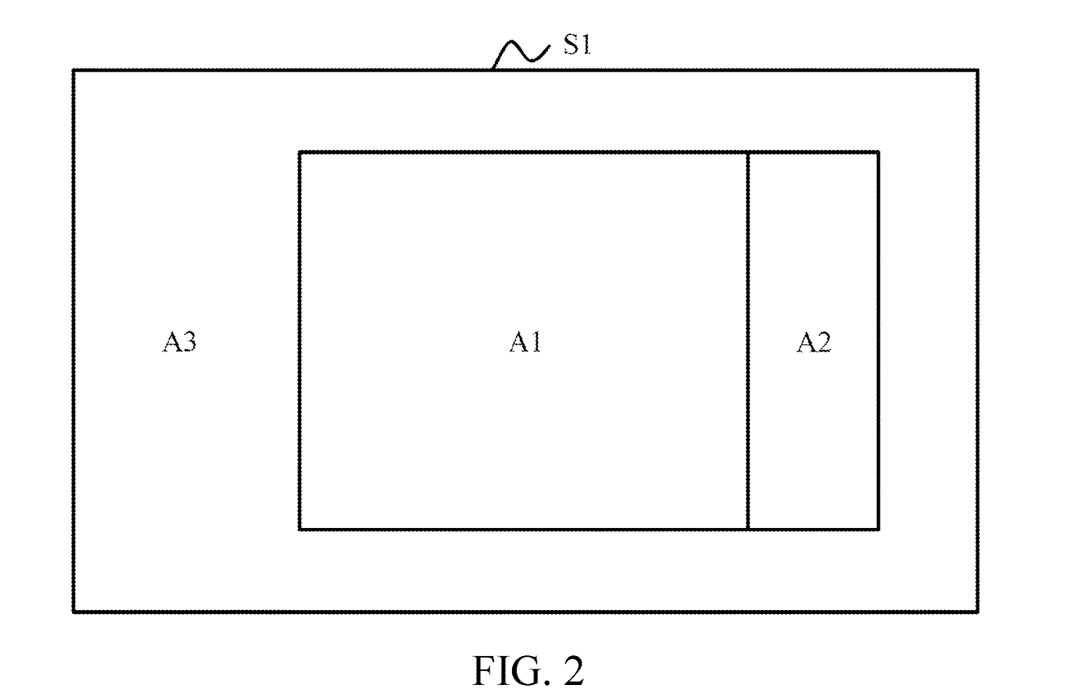
FIG. 2 is a schematic diagram of a composite video signal according to some embodiments of the present disclosure.

FIG. 1 is a schematic diagram of a video transmission system 10 according to some embodiments of the present disclosure. FIG. 2 is a schematic diagram of a composite video signal S1 according to some embodiments of the present disclosure. Referring to FIG. 1 and FIG. 2, in some embodiments, the video transmission system 10 includes a first processing circuit 100 and a second processing circuit 200. The first processing circuit 100 is configured to output a composite video signal S1. The composite video signal S1 includes a video area A1, an extension area A2, and an edge area A3. The extension area A2 stores a non-video signal S2. The second processing circuit 200 is configured to receive the composite video signal S1 and extract the non-video signal S2 from the composite video signal S1.

Specifically, in some embodiments, the composite video signal S1 is a frame video. The frame video includes an active video area and a porch area. In other words, the composite video signal S1 is a video signal. The video area A1 in the composite video signal S1 can store signal data of a real video, and the extension area A2 in the composite video signal S1 can store signal data of the non-video signal S2. When the first processing circuit 100 transmits the composite video signal S1 to the second processing circuit 200, in a video format of the composite video signal S1 (for example, a second video format disclosed in the subsequent paragraph), the video area A1 and the extension area A2 are used as the active video area, and the edge area A3 is used as the porch area. After the second processing circuit 200 receives the composite video signal S1, the second processing circuit 200 can process the composite video signal S1 by using two different video formats. In one of the video formats (for example, a first video format disclosed in the subsequent paragraph), the video area A1 is used as the active video area, and the extension area A2 and the edge area A3 are used as the porch area. In another video format (for example, the second video format disclosed in the subsequent paragraph), the video area A1 and extension area A2 are used as the active video area, and the edge area A3 is used as the porch area. Therefore, the processing of the composite video signal S1 by the second processing circuit 200 in the first video format is not affected by the extension area A2 storing the non-video signal S2. In contrast, the second processing circuit 200 can process the extension area A2 based on the extension area A2 belonging to different areas for different video formats and extract, from the extension area A2, the non-video signal S2 stored in the extension area A2.

In some embodiments, the first processing circuit 100 is configured to receive the non-video signal S2 and a basic video signal S0, and incorporate the non-video signal S2 into the basic video signal S0, to convert the basic video signal S0 in the first video format to the composite video signal S1 in the second video format.

Figure 3:
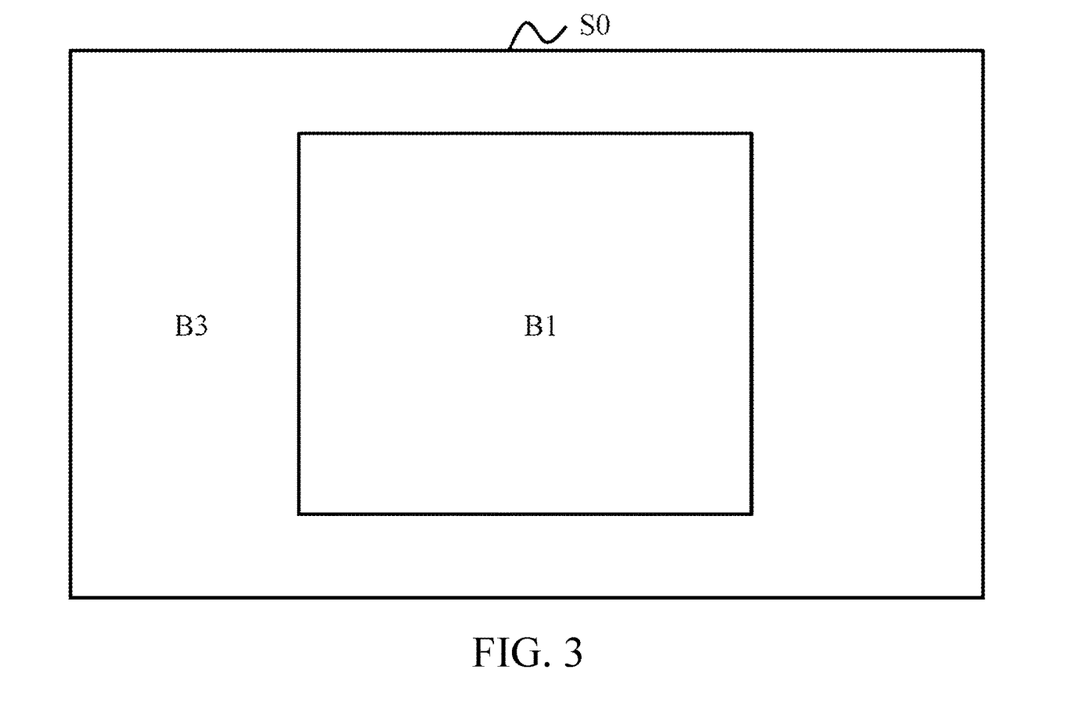
FIG. 3 is a schematic diagram of a basic video signal according to some embodiments of the present disclosure.

Specifically, in some embodiments, the basic video signal S0 is a frame video, that is, the basic video signal S0 also includes an active video area (for example, a basic video area B1 in FIG. 3) and a porch area (for example, a basic edge area B3 in FIG. 3). It should be noted that a difference between the basic video signal S0 and the composite video signal S1 includes that the basic video signal S0 is a video signal in the first video format, and the composite video signal S1 is a video signal in the second video format. In other words, when the basic video signal S0 and the composite video signal S1 are video signals of the same size, the active video areas of the basic video signal S0 and the composite video signal S1 have different sizes. Similarly, the sizes of the porch areas of the basic video signal S0 and the composite video signal S1 are also different. When the first processing circuit 100 incorporates the non-video signal S2 into the basic video signal S0, the first processing circuit 100 incorporates the non-video signal S2 into the porch area (for example, the basic edge area B3 in FIG. 3) of the basic video signal S0, and converts the basic video signal S0 incorporated into the non-video signal S2 to the second video format, that is, to the composite video signal S1 in the second video format.

FIG. 3 is a schematic diagram of a basic video signal according to some embodiments of the present disclosure. Referring to FIG. 2 and FIG. 3, in some embodiments, the first video format and the second video format have a horizontal video difference and a vertical video difference. The basic video signal S0 includes a basic video area B1 and a basic edge area B3. The first processing circuit 100 divides the basic edge area B3 into an extension area A2 and an edge area A3 according to the horizontal video difference and the vertical video difference, and stores the non-video signal S2 in the extension area A2. The first processing circuit 100 uses the basic video area B1 as the video area A1 and obtains the composite video signal S1 according to the video area A1, the extension area A2, and the edge area A3.

Specifically, in some embodiments, the horizontal video difference is a difference between a horizontal size of the active video area in the first video format and a horizontal size of the active video area in the second video format. The vertical video difference is a difference between a vertical size of the active video area in the first video format and a vertical size of the active video area in the second video format. The basic video signal S0 uses the basic video area B1 as the active video area, and uses the basic edge area B3 as the porch area. The first processing circuit 100 divides the basic edge area B3 into an extension area A2 and an edge area A3 according to the horizontal video difference and the vertical video difference. That is, the first processing circuit 100 determines a size of extension area A2 according to the horizontal video difference and the vertical video difference. For example, when the active video area in the first video format is "1920×1080", and the active video area of the second video format is "2020×1080", the size of the extension area A2 is "100×1080". Alternatively, when the active video area in the first video format is "1920×1080", and the active video area in the second video format is "1920×1180", the size of the extension area A2 is "1920×100", but the present disclosure is not limited to the two examples. After the first processing circuit 100 determines the part of the basic edge area B3 as the extension area A2, the first processing circuit 100 stores the non-video signal S2 in the extension area A2. Since the first processing circuit 100 uses the basic video area B1 as the video area A1, the video area A1 as the active video area, and the extension area A2 and the edge area A3 as the porch area, the composite video signal S1 can be obtained according to the video area A1, the extension area A2, and the edge area A3.

It should be noted that the present disclosure is not limited to the composite video signal S1 shown in FIG. 2 and the basic video signal S0 shown in FIG. 3. In some embodiments, the extension area A2 can completely surround the video area A1, or the extension area A2 can partially surround the video area A1. In some embodiments, the extension area A2 may not be arranged on one connected area, but may be arranged on two areas that are not connected to each other (the embodiment shown in FIG. 5) or on more than two areas that are not connected to each other.

In some embodiments, the part of the extension area A2 that does not store the non-video signal S2 is a redundant area (not shown in the figure), and the first processing circuit 100 stores the redundant signal (not shown in the figure) in the redundant area.

Specifically, in some embodiments, when the first processing circuit 100 fails to store the extension area A2 completely with the non-video signal S2, the redundant signal can be stored in the areas that do not store the non-video signal S2. In other words, the first processing circuit 100 can use the redundant signal different from the non-video signal S2 to divide the extension area A2 into the redundant area, so that the extension area A2 can distinguish the active non-video signal S2 and an inactive redundancy signal. It should be noted that, for example, when an amount of data of the non-video signal S2 is less than a data storage capacity of the extension area A2, or the extension area A2 has a fixed size, but the non-video signal S2 cannot be divided to have the same size as the extension area A2, the extension area A2 may not fully store the non-video signal S2.

In some embodiments, the first processing circuit 100 stores video format information, and the video format information includes a first video format and a second video format. When the first processing circuit 100 incorporates the non-video signal S2 into the basic video signal S0, the first processing circuit 100 converts the basic video signal S0 in the first video format to the composite video signal S1 in the second video format according to the video format information.

Specifically, in some embodiments, since the first processing circuit 100 stores video format information including the first video format and the second video format, the first processing circuit 100 can determine, according to the first video format and the second video format, that the basic edge area B3 of the basic video signal S0 can serve as a position of the extension area A2, and after the non-video signal S2 is incorporated into the position of the extension area A2, the basic video signal S0 in the first video format is converted to the composite video signal S1 in the second video format.

In some embodiments, the second processing circuit 200 stores video format information, and the video format information includes a first video format and a second video format. The second processing circuit 200 extracts the extension area A2 from the composite video signal S1 in the second video format according to the first video format and the second video format and extracts the non-video signal S2 from the extension area A2. The second processing circuit 200 captures the video area A1 from the composite video signal S1 in the second video format according to the first video format, uses the video area A1 as the basic video area B1, and obtains the basic video signal S0 in the first video format according to the basic video area B1.

Specifically, in some embodiments, the second processing circuit 200 stores the video format information including the first video format and the second video format. The second processing circuit 200 can determine, by using the first video format, that the video area A1 belongs to the active video area in the first video format, and determine, by using the second video format, that the video area A1 and the extension area A2 belong to the active video area in the second video format. Since the extension area A2 belongs to the porch area for the first video format, but belongs to the active video area for the second video format, the second processing circuit 200 can extract the extension area A2 from the composite video signal S1 in the second video format. Then the second processing circuit 200 extracts the non-video signal S2 from the extension area A2. Furthermore, since the second processing circuit 200 can determine, by using the first video format, that the video area A1 belongs to the active video area in the first video format, the second processing circuit 200 can extract the video area A1 from the composite video signal S1 in the second video format. Since the second processing circuit 200 uses the video area A1 as the basic video area B1 of the first video format, and the basic edge area B3 corresponding to the first video format can be obtained according to the basic video area B1, the basic video signal S0 can be obtained according to the basic video area B1 and the basic edge area B3. It should be particularly noted that, in some embodiments, since data in a specific format does not need to be particularly incorporated into the basic edge area B3, the basic video signal S0 can be obtained by obtaining the basic video area B1 in the first video format.

Figure 4:
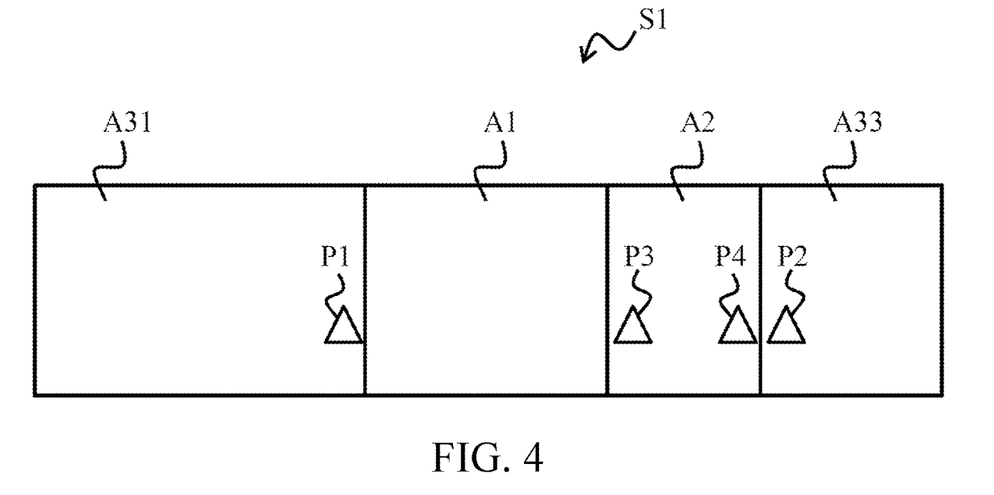
FIG. 4 is a partial schematic diagram of a composite video signal according to some embodiments of the present disclosure.

FIG. 4 is a partial schematic diagram of the composite video signal S1 according to some embodiments of the present disclosure. Referring to FIG. 2 and FIG. 4, in some embodiments, FIG. 4 is only a part of the composite video signal S1 of FIG. 2, for example, a line of codes of the composite video signal S1 in a horizontal direction. The edge area A3 includes a front edge area A31 and a rear edge area A33. The front edge area A31 is connected to the video area A1, the video area A1 is connected to the extension area A2, and the extension area A2 is connected to the rear edge area A33. The composite video signal S1 has a video start pointer P1, a video end pointer P2, an extension start pointer P3, and an extension end pointer P4. The video start pointer P1 is located at a position of the front edge area A31 that is adjacent to the video area A1, the extension start pointer P3 is located at a position of the extension area A2 that is adjacent to the video area A1, the extension end pointer P4 is located at a position of the extension area A2 that is adjacent to the rear edge area A33, and the video end pointer P2 is located at a position of the rear edge area A33 that is adjacent to the extension area A2. The second processing circuit 200 determines a boundary between the front edge area A31 and the video area A1 according to the video start pointer P1, determines a boundary between the video area A1 and the extension area A2 according to the extension start pointer P3, and determines a boundary between the extension area A2 and the rear edge area A33 according to the extension end pointer P4 and the video end pointer P2.

Specifically, in some embodiments, the video end pointer P2 of the basic video signal S0 is located at a position of the extension start pointer P3 of the corresponding composite video signal S1. In other words, when the first processing circuit 100 converts the basic video signal S0 in the first video format to the composite video signal S1 in the second video format, the position of the video end pointer P2 is reset, and the extension start pointer P3 and the extension end pointer P4 are added. Correspondingly, when obtaining the basic video signal S0 in the first video format according to the composite video signal S1 in the second video format, the second processing circuit 200 resets the position of the video end pointer P2, and deletes the extension start pointer P3 and the extension end pointer P4.

Figure 5:
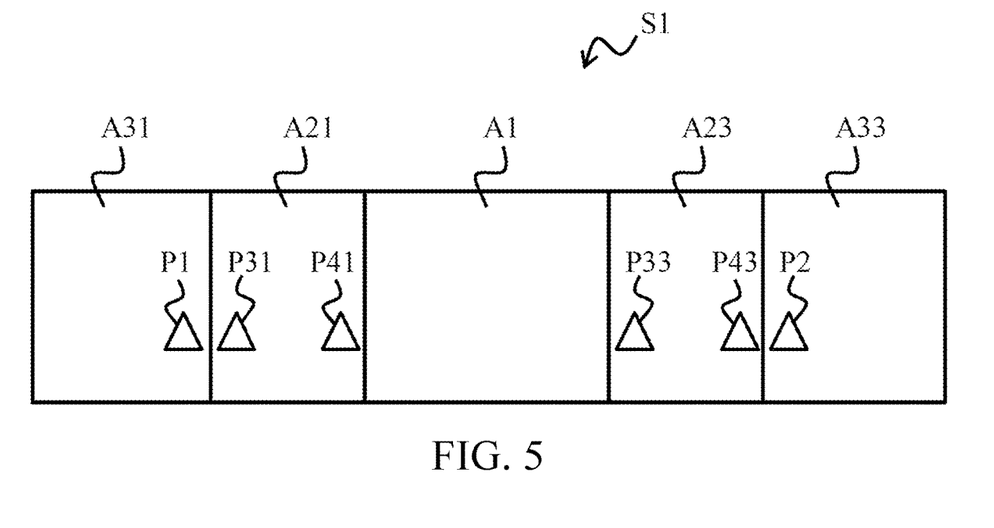
FIG. 5 is a partial schematic diagram of a composite video signal according to some embodiments of the present disclosure.

FIG. 5 is a partial schematic diagram of the composite video signal S1 according to some embodiments of the present disclosure. Referring to FIG. 2 and FIG. 5, in some embodiments, FIG. 5 is only a part of the composite video signal S1 of FIG. 2, for example, a line of codes of the composite video signal S1 in a horizontal direction. In some embodiments, the edge area A3 includes a front edge area A31 and a rear edge area A33. The extension area A2 includes a front extension area A21 and a rear extension area A23. The front edge area A31 is connected to the front extension area A21, the front extension area A21 is connected to the video area A1, the video area A1 is connected to the rear extension area A23, and the rear extension area A23 is connected to the rear edge area A33. The composite video signal S1 has a video start pointer P1, a video end pointer P2, a front extension start pointer P31, a front extension end pointer P41, a rear extension start pointer P33, and a rear extension end pointer P43. The video start pointer P1 is located at a position of the front edge area A31 that is adjacent to the front extension area A21, the front extension start pointer P31 is located at a position of the front extension area A21 that is adjacent to the front edge area A31, the front extension end pointer P41 is located at a position of the front extension area A21 that is adjacent to the video area A1, the rear extension start pointer P33 is located at a position of the rear extension area A23 that is adjacent to the video area A1, the rear extension end pointer P43 is located at a position of the rear extension area A23 that is adjacent to the rear edge area A33, and the video end pointer P2 is located at a position of the rear edge area A33 that is adjacent to the rear extension area A23. The second processing circuit determines a boundary between the front edge area A31 and the front extension area A21 according to the video start pointer P1 and the front extension start pointer P31, determines a boundary between the front extension area A21 and the video area A1 according to the front extension end pointer P41, determines a boundary between the video area A1 and the rear extension area A23 according to the rear extension start pointer P33, and determines a boundary between the rear extension area A23 and the rear edge area A33 according to the rear extension end pointer P43 and the video end pointer P2.

Specifically, in some embodiments, the video start pointer P1 of the basic video signal S0 is located at a position of the front extension end pointer P41 of the corresponding composite video signal S1, and the video end pointer P2 of the basic video signal S0 is located at a position of the rear extension start pointer P33 of the corresponding composite video signal S1. In other words, when the first processing circuit 100 converts the basic video signal S0 in the first video format to the composite video signal S1 in the second video format, the positions of the video start pointer P1 and the video end pointer P2 are reset, and the front extension start pointer P31, the front extension end pointer P41, the rear extension start pointer P33, and the rear extension end pointer P43 are added. Correspondingly, when the second processing circuit 200 obtains the basic video signal S0 in the first video format according to the composite video signal S1 in the second video format, the positions of the video start pointer P1 and the video end pointer P2 are reset, and the front extension start pointer P31, the front extension end pointer P41, the rear extension start pointer P33, and the rear extension end pointer P43 are deleted.

Figure 6:
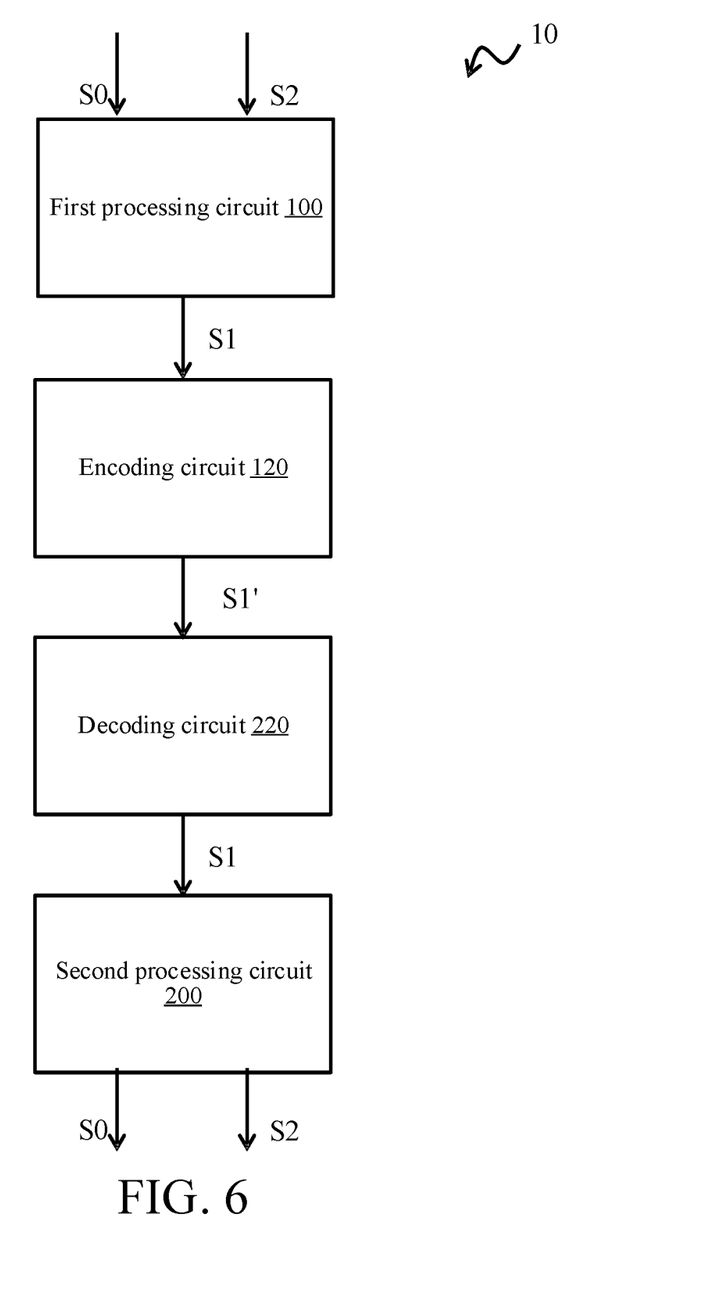
FIG. 6 is a schematic diagram of a video transmission system according to some other embodiments of the present disclosure.

FIG. 6 is a schematic diagram of the video transmission system 10 according to some other embodiments of the present disclosure. Referring to FIG. 6, in some embodiments, the video transmission system 10 includes a first processing circuit 100, a second processing circuit 200, an encoding circuit 120, and a decoding circuit 220. The encoding circuit 120 is configured to receive a composite video signal S1 from the first processing circuit 100, and encode the composite video signal S1 into an encoded composite video signal S1'. The decoding circuit 220 is configured to receive the encoded composite video signal S1' outputted by the encoding circuit 120, decode the encoded composite video signal S1' into a composite video signal S1, and output the composite video signal S1 to the second processing circuit 200. In other words, the first processing circuit 100 transmits the composite video signal S1 to the second processing circuit 200 through the encoding circuit 120 and the decoding circuit 220.

Figure 7:
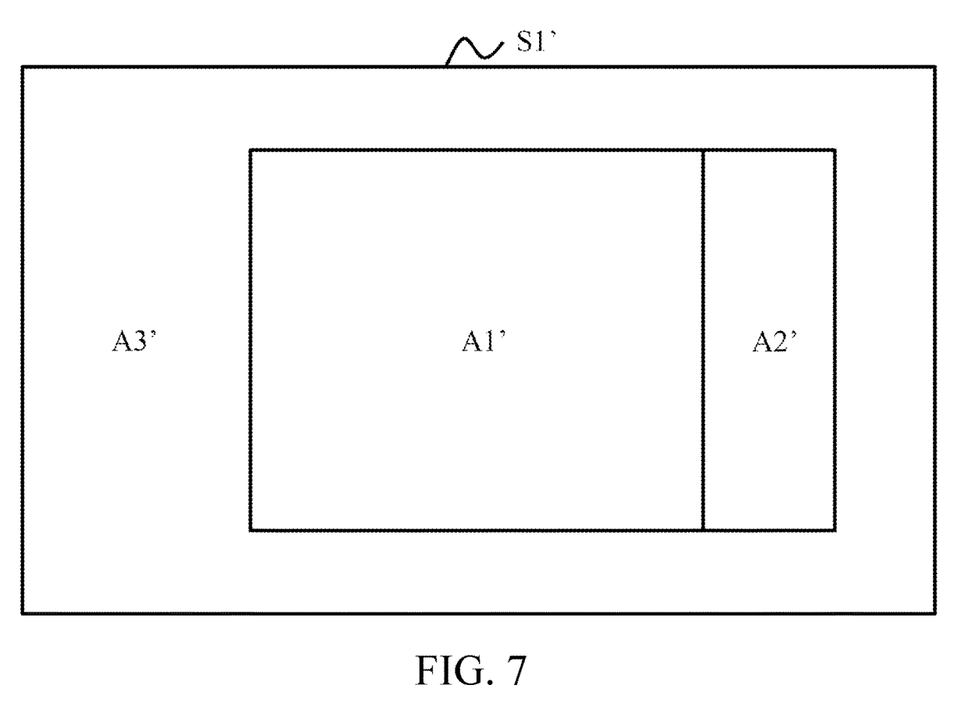
FIG. 7 is a schematic diagram of an encoded composite video signal according to some embodiments of the present disclosure.

FIG. 7 is a schematic diagram of the encoded composite video signal S1' according to some embodiments of the present disclosure. Referring to FIG. 6 and FIG. 7, specifically, in some embodiments, a difference between the encoded composite video signal S1' and the composite video signal S1 is that the encoded composite video signal S1' is the composite video signal S1 that is encoded, and therefore the encoded composite video signal S1' includes an encoded video area A1', an encoded extension area A2', and an encoded edge area A3'. For the encoding circuit 120, the composite video signal S1 is in a second video format, that is, the video area A1 and the extension area A2 are used as active video areas, and the edge area A3 is used as a porch area. In other words, the encoding circuit 120 encodes the data stored in the video area A1 and the extension area A2 with the active video area, the non-video signal S2 stored in the extension area A2 is also encoded with the active video area, and the edge area A3 performs encoding with the edge area. Therefore, the encoding circuit 120 can obtain the encoded composite video signal S1'. Correspondingly, for the encoding circuit 120, the encoded composite video signal S1' is in the second video format, that is, the encoded video area A1' and the encoded extension area A2' are used as the active video area, and the encoded edge area A3' is used as the porch area. The decoding circuit 220 uses the encoded video area A1' and the encoded extension area A2' as the active video area for decoding, and the encoded edge area A3' as the edge area for decoding, so that the decoding circuit 220 can obtain the composite video signal S1.

Figure 8:
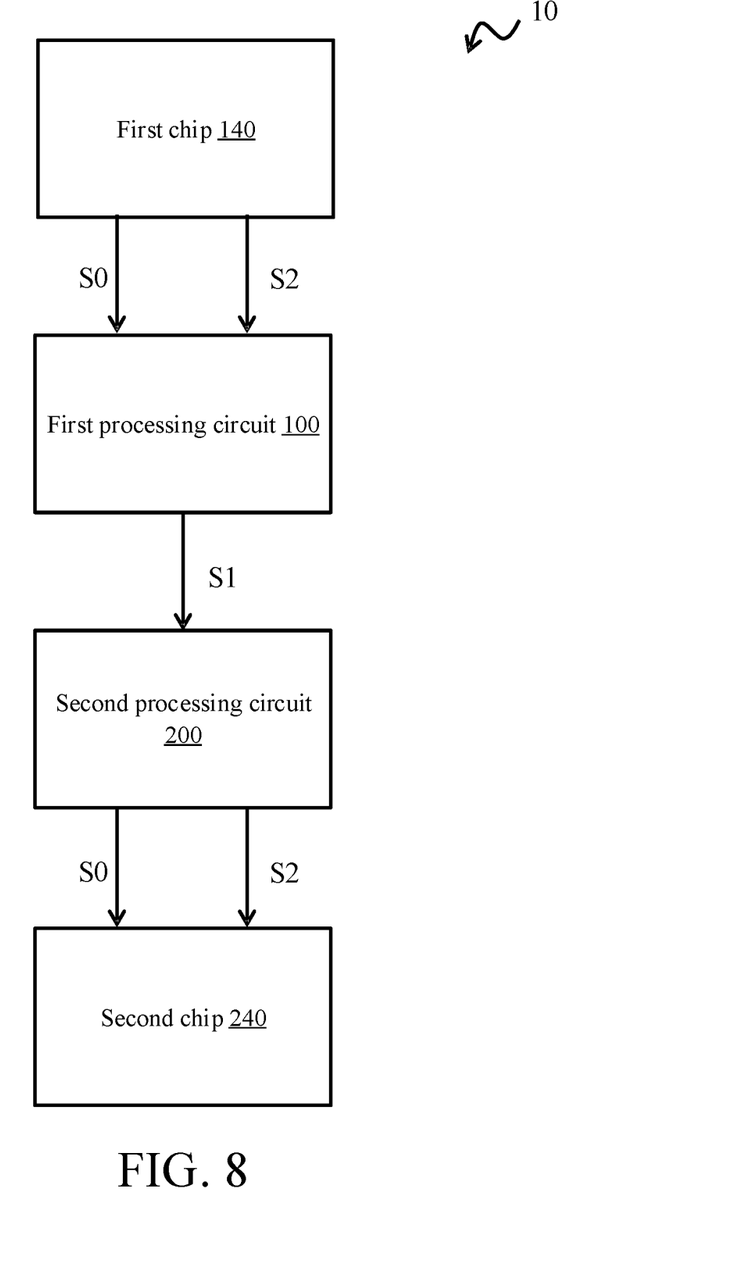
FIG. 8 is a schematic diagram of a video transmission system according to some other embodiments of the present disclosure.

FIG. 8 is a schematic diagram of the video transmission system 10 according to some other embodiments of the present disclosure. Referring to FIG. 8, in some embodiments, the video transmission system 10 includes a first processing circuit 100, a second processing circuit 200, a first chip 140, and a second chip 240. The first chip 140 is configured to output a basic video signal S0 and a non-video signal S2 to the first processing circuit 100. The second chip 240 is configured to receive the basic video signal S0 and the non-video signal S2 output by the second processing circuit 200.

Specifically, in some embodiments, the first chip 140 of the video transmission system 10 is configured to generate the basic video signal S0 and the non-video signal S2, and transmit the basic video signal S0 and the non-video signal S2 to the first processing circuit 100. The video transmission system 10 combines the basic video signal S0 and the non-video signal S2 into a composite video signal S1 by using the first processing circuit 100, and then the first processing circuit 100 transmits the composite video signal S1 to the second processing circuit 200 (in some embodiments, in a process that the first processing circuit 100 transmits the composite video signal S1 to the second processing circuit 200, the video transmission system 10 encodes and decodes the composite video signal S1 by using the encoding circuit 120 and the decoding circuit 220, and details are not described herein again). The video transmission system 10 then extracts the basic video signal S0 and the non-video signal S2 from the composite video signal S1 by using the second processing circuit 200. The second chip 240 of the video transmission system 10 receives the basic video signal S0 and the non-video signal S2 outputted by the second processing circuit 200, and generates a corresponding display picture and settings on a display device (not shown) according to the basic video signal S0 and the non-video signal S2.

In some embodiments, the first processing circuit 100, the second processing circuit 200, the encoding circuit 120, the decoding circuit 220, the first chip 140, and the second chip 240 can be designed in different chips or in the same chip. Alternatively, the first chip 140, the first processing circuit 100, and the encoding circuit 120 are designed in one chip, and the second processing circuit 200, the second chip 240, and the decoding circuit 220 are designed in another chip, but the present disclosure is not limited thereto.

In some embodiments, the first chip 140 is a TV SoC, and the second chip 240 is a panel chip. The basic video signal S0 includes a video and an audio. The non-video signal S2 includes dimming, a serial peripheral interface (SPI) setting, a pulse width modulation (PWM) setting, an integrated bus circuit (I2C) setting, and a firmware (FW) setting. The composite video signal S1 includes a video, an audio, dimming, a serial peripheral interface setting, a pulse width modulation setting, an integrated bus circuit setting, and a firmware setting.

Based on the above, according to the video transmission system in some embodiments of the present disclosure, signal transmission can be performed between the first processing circuit and the second processing circuit by using the composite video signal. Since the composite video signal is a video signal, the composite video signal includes a video signal and a non-video signal, and the second processing circuit can extract the non-video signal from the composite video signal, after the second processing circuit receives the composite video signal, the second processing circuit can obtain the video signal and the non-video signal. Therefore, the function of simultaneously transmitting the video signal and the non-video signal between the first processing circuit and the second processing circuit can be achieved by using the composite video signal, that is, only the transmission channel for transmitting the composite video signal is needed between the first processing circuit and the second processing circuit to achieve the function of simultaneously transmitting the video signal and the non-video signal.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. A video transmission system, comprising:
a first processing circuit configured to output a composite video signal, wherein the composite video signal comprises a video area, an extension area, and an edge area, and the extension area stores a non-video signal; and
a second processing circuit configured to receive the composite video signal and extract the non-video signal from the composite video signal;
wherein the first processing circuit is configured to receive the non-video signal and a basic video signal and incorporate the non-video signal into the basic video signal, so that the basic video signal in a first video format is converted to the composite video signal in a second video format;
wherein the first video format and the second video format have a horizontal video difference and a vertical video difference, and the basic video signal comprises a basic video area and a basic edge area;
wherein the first processing circuit divides the basic edge area into the extension area and the edge area according to the horizontal video difference and the vertical video difference, stores the non-video signal in the extension area, uses the basic video area as the video area, and obtains the composite video signal according to the video area, the extension area, and the edge area.

2. The video transmission system according to claim 1, wherein a part of the extension area that does not store the non-video signal is a redundant area, and the first processing circuit stores a redundant signal in the redundant area.

3. The video transmission system according to claim 1, wherein the first processing circuit stores video format information, and the video format information comprises the first video format and the second video format; and wherein when the first processing circuit incorporates the non-video signal into the basic video signal, the first processing circuit converts the basic video signal in the first video format to the composite video signal in the second video format according to the video format information.

4. The video transmission system according to claim 1, wherein the second processing circuit stores video format information, and the video format information comprises the first video format and the second video format; wherein
the second processing circuit extracts the extension area from the composite video signal in the second video format according to the first video format and the second video format and extracts the non-video signal from the extension area; and wherein
the second processing circuit extracts the video area from the composite video signal in the second video format according to the first video format, uses the video area as the basic video area, and obtains the basic video signal in the first video format according to the basic video area.

5. The video transmission system according to claim 1, wherein the edge area comprises a front edge area and a rear edge area, the front edge area is connected to the video area, the video area is connected to the extension area, and the extension area is connected to the rear edge area; wherein
the composite video signal has a video start pointer, a video end pointer, an extension start pointer, and an extension end pointer, the video start pointer is located at a position of the front edge area that is adjacent to the video area, the extension start pointer is located at a position of the extension area that is adjacent to the video area, the extension end pointer is located at a position of the extension area that is adjacent to the rear edge area, and the video end pointer is located at a position of the rear edge area that is adjacent to the extension area; and wherein
the second processing circuit determines a boundary between the front edge area and the video area according to the video start pointer, determines a boundary between the video area and the extension area according to the extension start pointer, and determines a boundary between the extension area and the rear edge area according to the extension end pointer and the video end pointer.

6. The video transmission system according to claim 1, wherein the edge area comprises a front edge area and a rear edge area, the extension area comprises a front extension area and a rear extension area, the front edge area is connected to the front extension area, the front extension area is connected to the video area, the video area is connected to the rear extension area, and the rear extension area is connected to the rear edge area; wherein
the composite video signal has a video start pointer, a video end pointer, a front extension start pointer, a front extension end pointer, a rear extension start pointer, and a rear extension end pointer, the video start pointer is located at a position of the front edge area that is adjacent to the front extension area, the front extension start pointer is located at a position of the front extension area that is adjacent to the front edge area, the front extension end pointer is located at a position of the front extension area that is adjacent to the video area, the rear extension start pointer is located at a position of the rear extension area that is adjacent to the video area, the rear extension end pointer is located at a position of the rear extension area that is adjacent to the rear edge area, and the video end pointer is located at a position of the rear edge area that is adjacent to the rear extension area; and wherein
the second processing circuit determines a boundary between the front edge area and the front extension area according to the video start pointer and the front extension start pointer, determines a boundary between the front extension area and the video area according to the front extension end pointer, determines a boundary between the video area and the rear extension area according to the rear extension start pointer, and determines a boundary between the rear extension area and the rear edge area according to the rear extension end pointer and the video end pointer.

7. The video transmission system according to claim 1, further comprising:
an encoding circuit configured to receive the composite video signal from the first processing circuit and encode the composite video signal into an encoded composite video signal; and
a decoding circuit configured to receive the encoded composite video signal outputted by the encoding circuit, decode the encoded composite video signal into the composite video signal, and output the composite video signal to the second processing circuit.

8. The video transmission system according to claim 1, further comprising:
a first chip configured to output the basic video signal and the non-video signal to the first processing circuit; and
a second chip configured to receive the basic video signal and the non-video signal outputted by the second processing circuit.

* * * * *